(12) United States Patent  
Long et al.

(10) Patent No.: US 12,019,196 B2
(45) Date of Patent: Jun. 25, 2024

(54) MARINE SURVEY DATA ACQUISITION AT A TOW LINE

(71) Applicant: PGS Geophysical AS, Oslo (NO)

(72) Inventors: Andrew Samuel Long, West Perth (AU); Stig Rune Lennart Tenghamn, Houston, TX (US)

(73) Assignee: PGS Geophysical AS, Oslo (NO)

( * ) Notice: Subject to any disclaimer, the term of this patent is extended or adjusted under 35 U.S.C. 154(b) by 687 days.

(21) Appl. No.: 17/120,377

(22) Filed: Dec. 14, 2020

(65) Prior Publication Data

US 2021/0190985 A1 Jun. 24, 2021

Related U.S. Application Data

(60) Provisional application No. 63/026,899, filed on May 19, 2020, provisional application No. 62/949,666, filed on Dec. 18, 2019.

(51) Int. Cl.
*G01V 1/38* (2006.01)
*G01V 1/20* (2006.01)

(52) U.S. Cl.
CPC ............ *G01V 1/3843* (2013.01); *G01V 1/201* (2013.01); *G01V 1/3808* (2013.01)

(58) Field of Classification Search
CPC ..... G01V 1/3843; G01V 1/201; G01V 1/3808
See application file for complete search history.

(56) References Cited

U.S. PATENT DOCUMENTS

| | | | |
|---|---|---|---|
| 5,856,954 A | 1/1999 | Grall | |
| 7,602,191 B2 | 10/2009 | Davidsson | |
| 7,738,317 B2 | 6/2010 | Toennessen | |
| 8,924,158 B2 | 12/2014 | Kragh et al. | |
| 8,976,622 B2 | 3/2015 | Hillesund et al. | |
| 9,244,184 B2 | 1/2016 | Voldsbekk | |
| 9,304,222 B2 | 4/2016 | Ni et al. | |
| 9,411,061 B2 | 8/2016 | Borgen | |
| 10,139,269 B2 | 11/2018 | Den Boer et al. | |
| 10,196,890 B2 | 2/2019 | Finfer et al. | |
| 10,241,220 B2 | 3/2019 | Pearce | |
| 10,324,203 B2 | 6/2019 | Long | |
| 10,371,845 B2 | 8/2019 | Guillot, III | |
| 10,393,572 B2 | 8/2019 | Farhadiroushan et al. | |
| 10,451,759 B2 | 10/2019 | Tenghamn | |
| 10,534,102 B2 | 1/2020 | Van Groenestijn | |

(Continued)

FOREIGN PATENT DOCUMENTS

| | | | | |
|---|---|---|---|---|
| EP | 3032286 A1 * | 6/2016 | ............... | G01V 1/36 |
| WO | WO-2016079592 A1 * | 5/2016 | ............ | B63B 21/66 |

OTHER PUBLICATIONS

Richter, et al., "Hydraulic fracture monitoring and optimizatin in unconventional completions using a high-resolution engineered fibre-optic Distributed Acoustic Sensor"; First Break, vol. 37, Apr. 2019 (6 pgs).

(Continued)

*Primary Examiner* — Krystine E Breier (57) ABSTRACT

Marine survey data can be acquired at a tow line. The tow line is designed to be coupled between a marine survey vessel and a towed object. A receiver is associated with the tow line and designed to receive marine survey data at a location of the tow line. The receiver can be an optical fiber or other type of receiver.

16 Claims, 5 Drawing Sheets

(56) References Cited

U.S. PATENT DOCUMENTS

| | | |
|---|---|---|
| 2006/0133202 A1 | 6/2006 | Tenghamn |
| 2009/0058422 A1 | 3/2009 | Tenghamn et al. |
| 2010/0045296 A1 | 2/2010 | Tenghamn |
| 2011/0199863 A1* | 8/2011 | Frivik ............... G01V 1/38 367/131 |
| 2012/0087207 A1* | 4/2012 | Kostov ............... G01V 1/38 367/20 |
| 2012/0275264 A1* | 11/2012 | Kostov ............ G01V 1/3808 367/16 |
| 2014/0025319 A1 | 1/2014 | Farhadiroushan et al. |
| 2014/0036624 A1 | 2/2014 | Tonchia |
| 2016/0170056 A1* | 6/2016 | Cowlard ............ G01V 1/36 367/24 |
| 2016/0258795 A1 | 9/2016 | Farhadiroushan et al. |
| 2018/0259665 A1 | 9/2018 | Landais et al. |
| 2019/0377097 A1 | 12/2019 | Dudley et al. |
| 2023/0251127 A1* | 8/2023 | Wilson ............... G01H 9/004 385/12 |

OTHER PUBLICATIONS

Silixa—Carina Sensing System Data Sheet Product Specifications (1 pg) https://silixa.com/wp-content/uploads/Carina-datasheet.pdf Accessed: Mar. 2020 & Copyrighted 2018.

* cited by examiner

MARINE SURVEY DATA ACQUISITION AT A TOW LINE

CROSS-REFERENCE TO RELATED APPLICATIONS

This application claims priority to U.S. Provisional Application 62/949,666, filed Dec. 18, 2019 and to U.S. Provisional Application 63/026,899, filed May 19, 2020, which are incorporated by reference as if entirely set forth herein.

BACKGROUND

In the past few decades, the petroleum industry has invested heavily in the development of marine survey techniques that yield knowledge of subterranean formations beneath a body of water in order to find and extract valuable mineral resources, such as oil. High-resolution images of a subterranean formation are helpful for quantitative interpretation and improved reservoir monitoring. For a typical marine survey, a marine survey vessel tows one or more marine survey sources (hereinafter referred to as "sources") below the sea surface and over a subterranean formation to be surveyed. Marine survey receivers (hereinafter referred to as "receivers") may be located on or near the seafloor, on one or more streamers towed by the marine survey vessel, or on one or more streamers towed by another vessel. The marine survey vessel typically contains marine survey equipment, such as navigation control, source control, receiver control, and recording equipment. The source control may cause the one or more sources, which can be impulsive sources such as air guns, non-impulsive sources such as marine vibrator sources, electromagnetic sources, etc., to produce signals at selected times. Each signal is essentially a wave called a wavefield that travels down through the water and into the subterranean formation. At each interface between different types of rock, a portion of the wavefield may be refracted, and another portion may be reflected, which may include some scattering, back toward the body of water to propagate toward the sea surface. The receivers thereby measure a wavefield that was initiated by the actuation of the source.

DETAILED DESCRIPTION

The present disclosure is related to a marine survey data acquisition at a tow line. A marine survey can be a seismic survey, electromagnetic survey, or other types or combinations of types of marine surveys. Marine survey data is data obtained from a marine survey and can include geophysical data, which is data describing the earth. The marine survey can measure physical properties of the subsurface, along with anomalies in those properties, which can be used to detect or infer the presence and position of economically useful geological deposits such as hydrocarbons. As mentioned above, for a typical marine survey, receivers may be located on or near the seafloor or on one or more streamers towed by a marine survey vessel. Some marine surveys may include the use of nearfield receivers, such as hydrophones, in the vicinity of the source in order to receive a source wavefield directly from the source without it being reflected or refracted. In contrast, according to at least one embodiment of the present disclosure, a receiver is associated with a tow line, and the receiver is configured to receive marine survey data at a location of the tow line. That the receiver is associated with the tow line means that the receiver is coupled to or integrated with the tow line. A tow line is a piece of marine survey equipment that is used to tow an object behind a marine survey vessel in the water. The tow line is coupled to the marine survey vessel and to the towed object. Examples of tow lines, described in more detail below with respect to FIG. 2, include lead-ins and umbilicals, among others. Streamers, which include receivers, are not tow lines. A streamer is a towed object, which can be towed by a tow line such as a lead-in.

At least one embodiment of the present disclosure can advantageously provide for the acquisition of marine survey data at negative source-receiver offsets. An offset is the distance between the source and a receiver. Typically, the direction downstream of the source (behind the source in the direction of travel) is characterized as being the positive direction. Therefore, as described in more detail below, negative source-receiver offsets refer to the positioning of receivers upstream of the source (ahead of the source in the direction of travel) such that the offset between the source and receiver is characterized as being negative. According to at least one embodiment of the present disclosure, this acquisition at negative source-receiver offsets can be achieved without the use of additional tow lines beyond those that would otherwise be used to tow objects, such as streamers or sources, as part of the marine survey. Accordingly, acquisition at negative source-receiver offsets according to at least one embodiment of the present disclosure does not increase the complexity of the towing operation of the marine survey, nor does it significantly increase the cost of performing the marine survey.

The present disclosure describes various embodiments relating to primary reflections ("primaries") and multiple reflections ("multiples"). Primaries are generally up-going reflections of a down-going source wavefield. Multiples can be divided into down-going multiples and up-going multiples. A down-going multiple is a reflection of a wavefield (whether a primary or a multiple) off of a sea surface. An up-going multiple is a reflection of a down-going multiple.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected and, unless stated otherwise, can include a wireless connection.

The figures herein follow a numbering convention in which the first digit or digits correspond to the drawing figure number and the remaining digits identify an element or component in the drawing. Similar elements or components between different figures may be identified by the use of similar digits. For example, 126 may reference element "26" in FIG. 1, and a similar element may be referenced as 226 in FIG. 2. Analogous elements within a Figure may be referenced with a hyphen and extra numeral or letter. See, for example, elements 240-1, and 240-2 in FIG. 2. Such elements may be referenced generally without the hyphen and extra numeral. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

Figure 1:
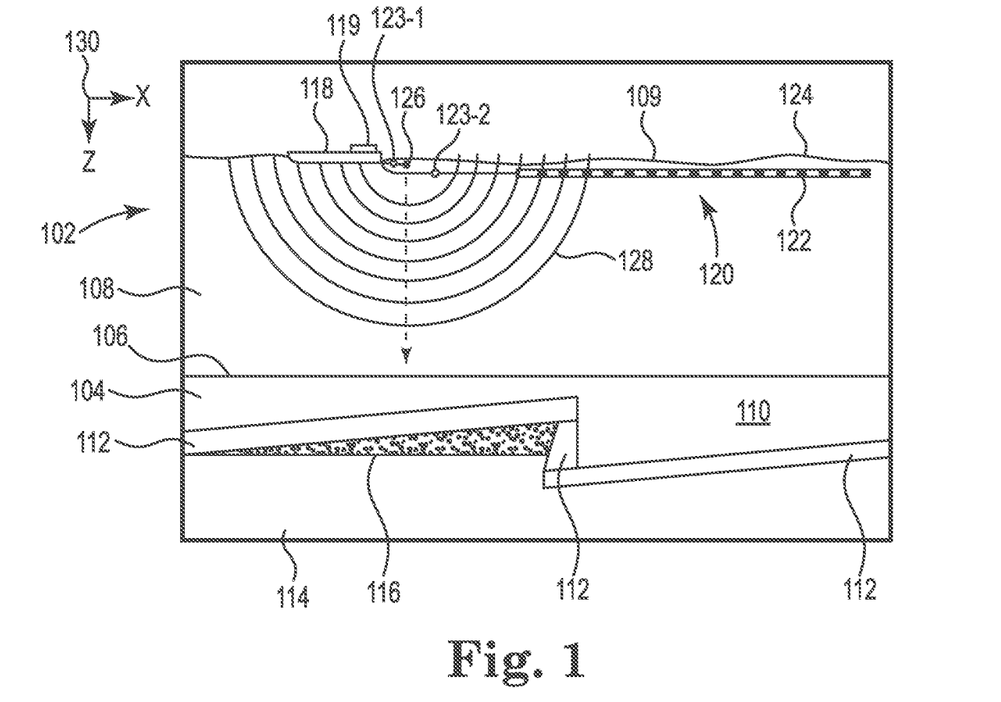
FIG. 1 is an elevation or xz-plane view illustrating marine surveying in which signals are emitted by a source for recording by receivers.

FIG. 1 is an elevation or xz-plane 130 view illustrating marine surveying in which signals are emitted by a source 126 for recording by receivers 122. The recording can be used for processing and analysis in order to help characterize the structures and distributions of features and materials underlying the surface of the earth. For example, the recording can be used to estimate a physical property of a subsurface location, such as the presence of a reservoir that may contain hydrocarbons. FIG. 1 shows a domain volume 102 of the earth's surface comprising a subsurface volume 104 of sediment and rock below the surface 106 of the earth that, in turn, underlies a fluid volume 108 of water having a sea surface 109 such as in an ocean, an inlet or bay, or a large freshwater lake. The domain volume 102 shown in FIG. 1 represents an example experimental domain for a class of marine surveys. FIG. 1 illustrates a first sediment layer 110, an uplifted rock layer 112, an underlying rock layer 114, and a hydrocarbon-saturated layer 116. One or more elements of the subsurface volume 104, such as the first sediment layer 110 and the uplifted rock layer 112, can be an overburden for the hydrocarbon-saturated layer 116. In some instances, the overburden may include salt.

FIG. 1 shows an example of a marine survey vessel 118 equipped to carry out marine surveys in accordance with the present disclosure. In particular, the marine survey vessel 118 can tow one or more streamers 120 (shown as one streamer for ease of illustration) generally located below the sea surface 109. The streamers 120 can be long cables containing power and data-transmission lines (e.g., electrical, optical fiber, etc.) to which receivers may be coupled. In one type of marine survey, each receiver, such as the receiver 122 represented by the shaded disk in FIG. 1, comprises a pair of sensors including a geophone that detects particle displacement within the water by detecting particle motion variation, such as velocities or accelerations, and/or a receiver that detects variations in pressure. However, embodiments are not so limited. Surveys can include receivers 122 that are only pressure sensors, pressure and motion sensors, or electromagnetic sensors, among others. In one type of marine survey, each receiver, such as the receiver 122, comprises an electromagnetic receiver that detects electromagnetic energy within the water. The streamers 120 and the marine survey vessel 118 can include sensing electronics and data-processing facilities that allow receiver readings to be correlated with absolute locations on the sea surface and absolute three-dimensional locations with respect to a three-dimensional coordinate system. In FIG. 1, the receivers along the streamers 120 are shown to lie below the sea surface 109, with the receiver locations correlated with overlying surface locations, such as a surface location 124 correlated with the location of receiver 122.

The marine survey vessel 118 can tow a source 126 that produces signals as the marine survey vessel 118 and streamers 120 move across the sea surface 109. The source 126 and/or streamers 120 may also be towed by other vessels or may be otherwise disposed in fluid volume 108. For example, the receivers may be located on ocean bottom cables or nodes fixed at or near the surface 106. For the sake of efficiency, illustrations and descriptions herein show receivers located on streamers, but it should be understood that references to receivers located on a "streamer" or "cable" should be read to refer equally to receivers located on a towed streamer, an ocean bottom receiver cable, and/or an array of nodes.

FIG. 1 shows acoustic energy illustrated as an expanding, spherical signal, illustrated as semicircles of increasing radius centered at the source 126, representing a down-going wavefield 128, following a signal emitted by the source 126. The down-going wavefield 128 is, in effect, shown in a vertical plane cross section in FIG. 1. The outward and downward expanding down-going wavefield 128 may eventually reach the surface 106, at which point the outward and downward expanding down-going wavefield 128 may partially scatter, may partially reflect back toward the streamers 120, the receivers 122 associated therewith, and the receivers 123 associated with various tow lines. The wavefield 128 may partially refract downward into the subsurface volume 104, becoming elastic signals within the subsurface volume 104.

According to at least one embodiment of the present disclosure, an additional receiver 123 is associated with a tow line. For example, a first receiver 123-1 is illustrated as being associated with the tow line coupled to the source 126 and a second additional receiver 123-2 is illustrated as being associated with the tow line coupled to the streamer 120. Embodiments are not limited to a particular quantity or location of the additional receivers associated with the tow lines. The receivers 123 are configured to receive marine survey data at a location of the tow line with which they are associated. The additional receivers 123 can includes sensors such as those described above with respect to the receiver 122. The additional receivers 123 can include sensors such as passive accelerometer-based sensors on piezoceramic piezoelectric structures or microelectromechanical systems (MEMS) sensors, among others. Alternatively, the additional receivers can be optical fibers that are internal to or external to the tow lines with which they are associated, as described in more detail with respect to FIG. 4. For example, the additional receiver 123-1 can be an optical fiber that runs along an interior space of the tow line coupled to the source 126 and configured to receive marine survey data at a location of that tow line.

The marine survey vessel 118 can include a controller 119. Although not specifically illustrated in FIG. 1, the marine survey vessel 118 can include an interrogator coupled to or integrated with the controller 119 for embodiments in which the receivers 123 comprise optical fibers. The controller 119 can generally control the source 126 and receivers 122, 123. The controller 119 can include an actuation system and a recording system, which may be separate systems that communicate data between each other, or they may be sub-systems of an integrated system. The control system can be configured to selectively actuate the source 126, while the recording system can be configured to record the signals received by receivers 122, 123 in response to the energy imparted into the water and thereby into subterranean formations below the solid surface 104. The recording system can be configured to determine and record the geodetic positions of the source 126 and the receivers 122, 123 at any time. Source actuation and signal recording by the receivers 122, 123 may be repeated a plurality of times while the marine survey vessel 118 moves through the water. Each actuation record may include, for each receiver 122, 123, signals corresponding to the energy produced by the source 126.

Figure 2:
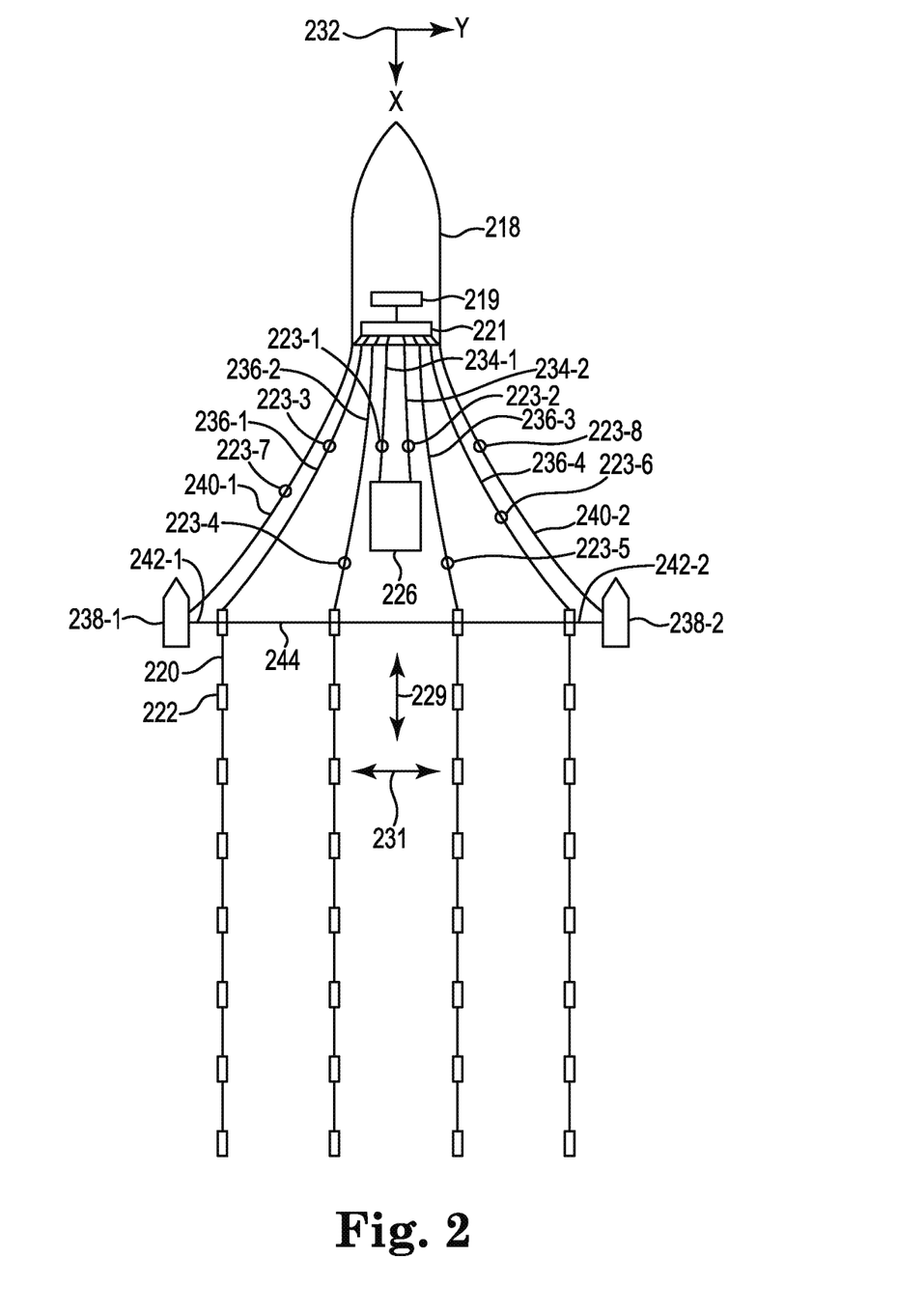
FIG. 2 is a plan or yx-plane view of a marine survey setup illustrating examples of embodiments of receivers associated with tow lines.

FIG. 2 is a plan or yx-plane 232 view illustrating a marine survey setup including examples of embodiments of receivers 223 associated with tow lines. FIG. 2 shows an example of a marine survey vessel 218 equipped to carry out marine surveys and to tow one or more towed objects through water. The towed objects can be streamers 220, which can include one or more receivers 222. Other examples of towed objects include sources 226. Although only one source 226 appears in FIG. 2 for ease of illustration, embodiments are not so limited. The towed objects can be coupled to marine survey equipment, particularly towing equipment, that maintains the towed objects at selected positions, including depth and lateral positions, with respect to each other and with respect to the marine survey vessel 218.

The towing equipment includes various tow lines. Tow lines are lines coupled between the marine survey vessel 218 and a towed object. Although not required for any particular embodiment, but shown for illustration, each of the tow lines illustrated in FIG. 2 includes and associated receiver 223. Although the receivers 223 are illustrated as circles at particular locations along the tow lines, embodiments are not so limited. The receivers 223 can be in different positions than those illustrated along the tow lines, or can be distributed along the tow lines, such as in the case of an optical fiber receiver 223. At least a portion of the optical fiber receiver 223 can be positioned with respect to the tow line to be towed in water at a negative offset from the source 226. At least a portion of the optical fiber receiver 223 can be positioned with respect to the tow line to be towed in water within a critical distance from the source 226. The critical distance is described in more detail with respect to FIG. 3. The tow lines and associated receivers 223 illustrated in FIG. 2 are just one example. Other towing configurations and arrangements of receivers associated with tow lines can be used in different embodiments.

The tow lines illustrated in FIG. 2 include umbilicals 234-1, 234-2 coupled between the marine survey vessel 218 and the source 226. The umbilicals 234 can include power cables, air cables, or other cabling used to communicate with or provide energy to the source 226. The umbilicals 234 also provide the tension necessary to tow the source 226 through the water. The first umbilical 234-1 is illustrated as having an associated receiver 223-1 and the second umbilical 234-2 is illustrated as having an associated receiver 223-2. The receivers 223-1, 223-2 associated with the umbilicals 234-1, 234-1 can be located at a negative source-receiver offset because the receivers 223-1, 223-2 are upstream from the source 226 (ahead of the source 226 in the direction of travel, in the in-line direction 229).

The in-line direction 229 is generally colinear with the x-axis and in line with the direction of travel of the marine survey vessel 218. For embodiments in which the streamers are towed in a straight-line configuration (as opposed to a fanned configuration, for example) the in-line direction is parallel to the streamers 220. The crossline direction 231 is perpendicular to the in-line direction 229 and crosses the length of the streamers 220. The streamers 220 are generally spaced apart in the crossline direction 231. Although not specifically illustrated, in at least one embodiment, the streamers 220 can be towed in a curved path.

The tow lines illustrated in FIG. 2 include lead-ins 236 coupled between the marine survey vessel 218 and the streamers 220. The lead-ins 236 thereby allow the marine survey vessel 218 to tow the streamers 220. The lead-ins 236 can include electrical or optical connections between the appropriate components in the recording system on the marine survey vessel 218 and the receivers 222 on the streamers 220. The first lead-in 236-1 is illustrated as having an associated receiver 223-3, the second lead-in 236-2 is illustrated as having an associated receiver 223-4, the third lead-in 236-3 is illustrated as having an associated receiver 223-5, and the fourth lead-in 236-4 is illustrated as having an associated receiver 223-6.

In at least one embodiment, the receivers 223-3, 223-4, 223-5, 223-6 can make use of the electrical or optical connection provided by the lead-ins 236 to communicate data received thereby with the recording system on the marine survey vessel 218. It may be cost and material efficient to use the same connection, for example, where the receivers 223-3, 223-4, 223-5, 223-6 are internal to the lead-ins 236. In at least one embodiment, the receivers 223-3, 223-4, 223-5, 223-6 can communicate data received thereby with the recording system on the marine survey vessel 218 with electrical or optical connections separate from the electrical or optical connection provided by the lead-ins 236. It may be more cost effective to provide a separate connection for the receivers 223-3, 223-4, 223-5, 223-6, for example, where the lead-ins 236 are pre-provided as a closed system or where the receivers 223-3, 223-4, 223-5, 223-6 are external to the lead-ins 236. In at least one embodiment, one or more of the receivers 223 can communicate wirelessly with the recording system on the marine survey vessel 218 or with a recording system located elsewhere. In at least one embodiment, one or more of the receivers can store received data locally for later download without transmitting the data to a recording system located on the marine survey vessel 218.

The receivers 223-3, 223-4, 223-5, 223-6 can be positioned with respect to the lead-ins 236 so as to provide data at a desired offset from the source 226. For example, if data (e.g., additional to that provided by the receivers 223-1, 223-2, when so employed) is desired with a negative source-receiver offset, the receivers 223-3, 223-4, 223-5, 223-6 can be positioned along the lead-ins 236 so as to be closer to the marine survey vessel in the in-line direction 229 than the source 226 during towing. If data is desired with a near-zero source-receiver offset (in the in-line direction 231), then the receivers 223-3, 223-4, 223-5, 223-6 can be positioned along the lead-ins 236 so as to be at an equal distance from the marine survey vessel 218 in the in-line direction 229 as the source 226 during towing. If data is desired with a near, but positive source-receiver offset, then the receivers 223-3, 223-4, 223-5, 223-6 can be positioned along the lead-ins 236 so as to be farther from the marine survey vessel 218 in the in-line direction 229 than the source 226 during towing.

The tow lines illustrated in FIG. 2 include other lead-ins referred to in the art as super-wide ropes 240 coupled between the marine survey vessel 218 and paravanes 238. The term "super-wide" should not be read to imply anything about the width of the spread of streamers 220 towed by the marine survey vessel 218. Rather, the term "super-wide" refers to the fact that the super-wide ropes 240 are towed outside the width of the spread of streamers 220 in the crossline direction 231. The first super-wide rope 240-1 is illustrated as having an associated receiver 223-7 and the second super-wide rope 240-2 is illustrated as having an associated receiver 223-8. The receivers 223-7, 223-8 can be positioned with respect to the super-wide ropes 240 so as to provide data at a desired offset from the source 226. For example, if data (e.g., additional to that provided by the receivers 223-1, 223-2, when so employed) is desired with a negative source-receiver offset, the receivers 223-7, 223-8 can be positioned along the super-wide ropes 240 so as to be closer to the marine survey vessel in the in-line direction 229 than the source 226 during towing. If data is desired with a near-zero source-receiver offset (in the in-line direction 231), then the receivers 223-7, 223-8 can be positioned along the super-wide ropes 240 so as to be at an equal distance from the marine survey vessel 218 in the in-line direction 229 as the source 226 during towing. If data is desired with a near, but positive source-receiver offset, then the receivers 223-7, 223-8 can be positioned along the super-wide ropes 240 so as to be farther from the marine survey vessel 218 in the in-line direction 229 than the source 226 during towing. Although not specifically illustrated, the umbilicals 234 can be coupled to the marine survey vessel 218 by way of winches or other towing equipment to enable adjusting the deployed length of each umbilical 234, lead-in 236, or super-wide rope 240.

Although not specifically illustrated, the super-wide ropes 240 can be coupled to the paravanes 238 via bridles, as is known in the art. The paravanes 238 are each configured to provide a lateral force component to the various towed object coupled thereto when the paravanes 238 are towed in the water. The paravanes 238 can maintain a spread of the streamers 220 in the crossline direction 231. The combined lateral forces provided by the paravanes 238 separate the paravanes 238 from each other constrained by spreader line 244 coupled between the paravanes 238. In at least one embodiment, the paravanes 238 can be coupled directly to the spreader line 244. In at least one embodiment, as illustrated, the first paravane 238-1 can be coupled to the spreader line 244 by a first spur line 242-1 and the second paravane 238-2 can be coupled to the spreader line 244 by a second spur line 242-2.

Figure 4:
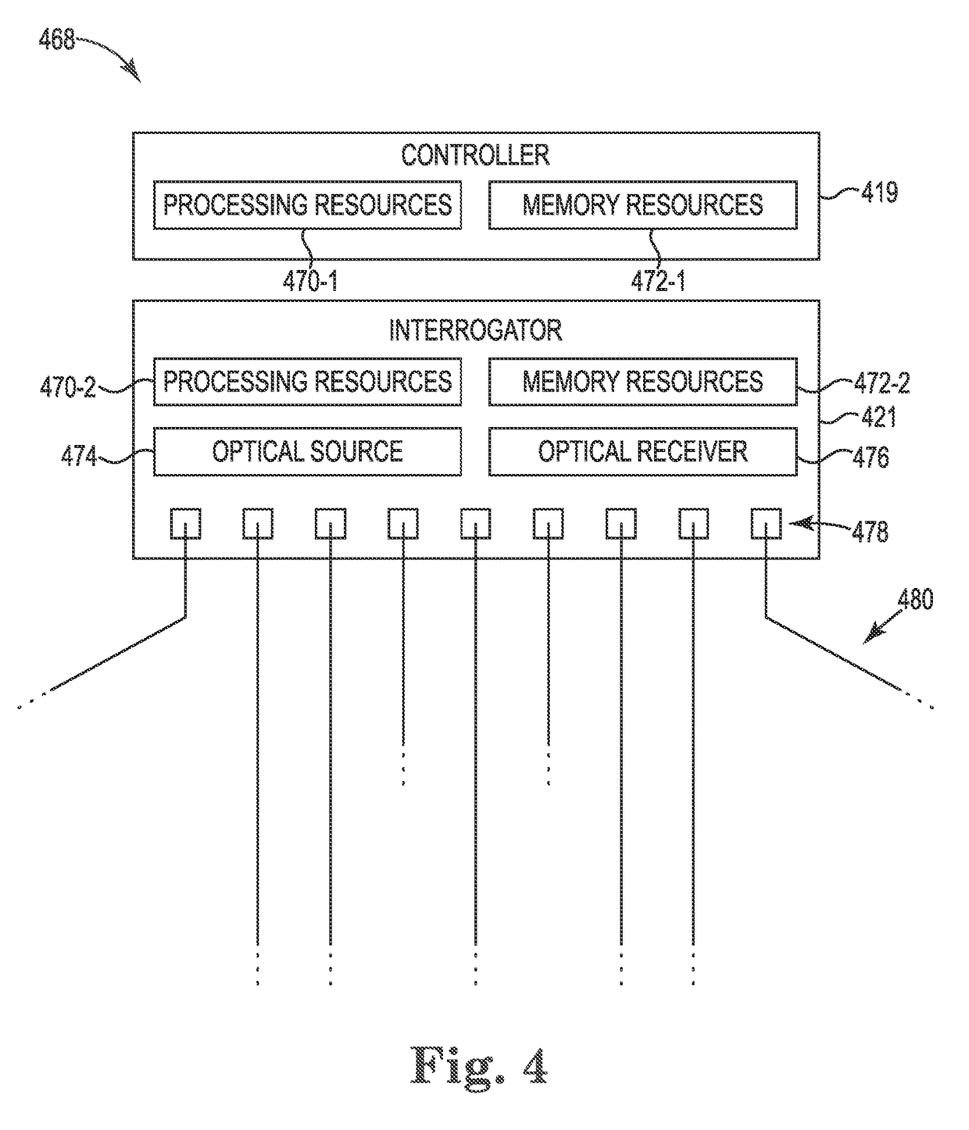
FIG. 4 illustrates an exemplary embodiment of a system for marine survey data acquisition at a tow line.

In at least one embodiment, the marine survey vessel 218 includes a controller 219 coupled to an interrogator 221 via one or more communication links as described in more detail with respect to FIG. 4. The interrogator 221 can be coupled to the tow lines to control and receive data from the receivers 223 associated therewith. However, at least one embodiment does not include the interrogator 221.

Figure 3A:
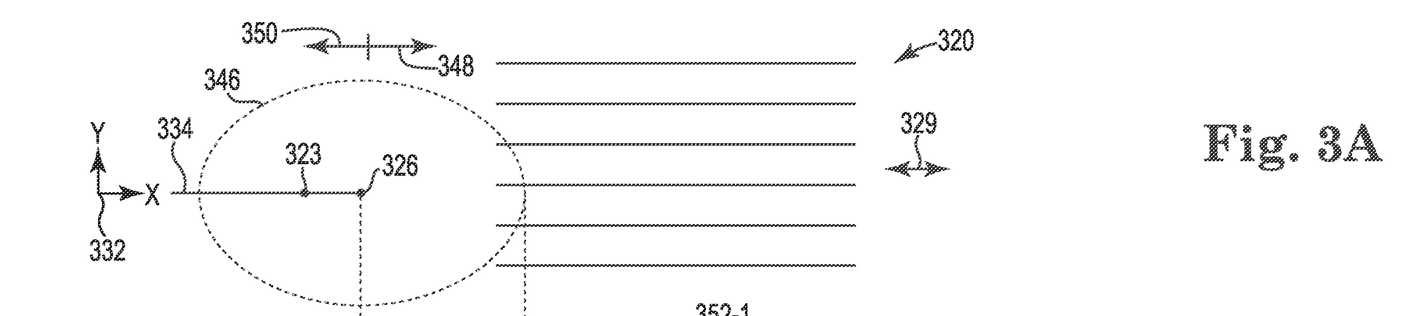
FIG. 3A is a plan or yx-plane view of a marine survey setup illustrating an example of a critical distance.
Figure 3B:
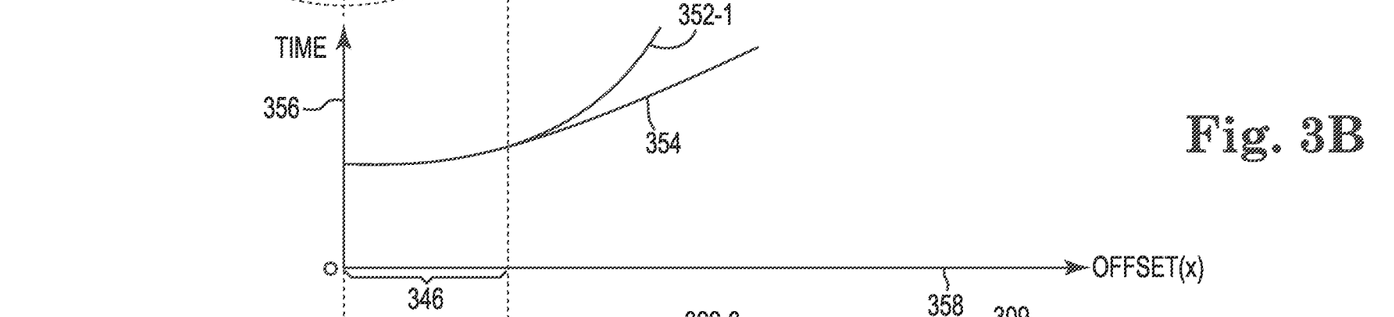
FIG. 3B is a plot of time versus offset illustrating a critical distance.
Figure 3C:
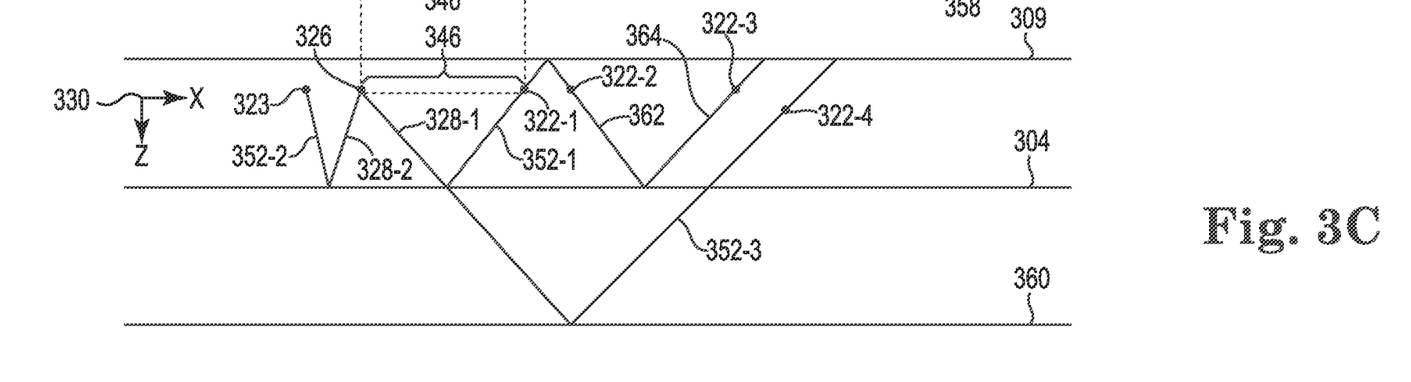
FIG. 3C is an elevation or xz-plane view of a state representing marine surveying illustrating a critical distance as well as primaries and multiples represented as rays.

FIG. 3A is a plan or yx-plane 332 view of a marine survey setup illustrating an example of a critical distance 346. FIG. 3B is a plot of time 356 versus offset 358 illustrating a critical distance 346 for the marine survey setup illustrated in FIGS. 3A and 3B. FIG. 3C is an elevation or xz-plane 330 view of the marine survey setup of FIG. 3A. FIGS. 3A, 3B, and 3C are correlated positionally with one another, but are not drawn to scale. For example, the position of the source 326 is the same in FIGS. 3A and 3C along their respective x-axes. Furthermore, the critical distance 346 is the same along the x-axes of FIGS. 3A, 3B, and 3C.

The marine survey setup in FIGS. 3A-3C can be analogous to that illustrated in FIG. 1 or FIG. 2, or a different setup. FIG. 3A includes an illustration of a source 326 and a tow line, specifically an umbilical 334. The umbilical 334 is coupled to the source 326. Although not specifically illustrated, the marine survey setup can include a marine survey vessel coupled to the umbilical 334 and can include additional sources 326 and umbilicals 334. The umbilical 334 has a receiver 323 associated therewith, as described herein. Although not specifically illustrated, the marine survey setup can include tow lines, such as lead-ins, for the streamers 320, where the lead-ins can also be associated with respective receivers. FIG. 3A includes an illustration depicting the convention for what is referred to as positive source-receiver offsets 348 and negative source-receiver offsets 350. Any receiver in the marine survey setup positioned opposite the marine survey vessel side of the sources 326 is considered to have a positive source-receiver offset 348 in the in-line direction 329. Any receiver positioned on the marine survey vessel side of the sources 326 is considered to have a negative source-receiver offset 350 in the in-line direction 329.

In the art, the critical distance 346 is defined as the source-receiver offset at which the reflection time equals the refraction time for the energy from the source to the receiver as illustrated in FIG. 3B. Stated differently, the critical distance 346 is the shortest offset where a refraction 354 is first received (or would be received if a receiver was so positioned). The times 356 and offsets 358 at which the refraction 354 are received are indicated by the straight line, which begins at an offset 358 equal to the critical distance 346. The times 356 and offsets 358 at which the reflection (first up-going primary 352-1) are received are indicated by the curved line. The refraction 354 is not illustrated in FIG. 3C.

The state illustrated in FIG. 3C includes a sea surface 309, a solid surface 304, and a subsurface reflector 360 underlying the solid surface 304. The sea surface 309, solid surface 304, and subsurface reflector 360 are illustrated as straight lines for convenience and simplicity, but are not indicative of real Earth layouts. The state includes a source 326 and various receivers 322, 323. For ease of illustration, the receivers are located at a same depth as the source 326, however embodiments are not so limited. Typically, receivers 322 associated with streamers 320 are towed at a greater depth than the source 326. The receiver 323 associated with the umbilical 334 may be at approximately the same depth as and/or shallower than the source 326.

The source 326 can emit a down-going source wavefield represented as a first down-going ray 328-1 and a second down-going ray 328-2. The state includes a plurality of receivers 322-1, 322-2, 322-3, 322-4 that are associated with the streamers 320 in FIG. 3A at convenient locations for purposes of illustration. The first down-going ray 328-1 can reflect off of the solid surface 304 as a first up-going primary 352-1, which can be received by a first receiver 322-1. The offset between the source 326 and the first receiver 322-1 is equal to the critical distance 346. The first up-going primary 352-1 can continue and reflect off of the sea surface 309 as a down-going multiple 362. The down-going multiple 362 can reflect off of the solid surface 304 as an up-going multiple 364, which can be received by a first receiver 322-3.

The second down-going ray 328-2 can reflect off of the solid surface 304 as a second up-going primary 352-2, which can be received by the receiver 323, which is associated with the umbilical 334. The receiver 323 is positioned within the critical distance 346 from the source and has a negative offset 350 from the source 326. This allows additional marine survey data to be received within the critical distance 346 and allows marine survey data to be received at negative offsets from the source 326.

A portion of the energy from the first down-going ray 328-1 can pass through the solid surface 304 and continue to the subsurface reflector 360, where it is reflected as a third up-going primary 352-3. The up-going primary 352-3 can be received by a fourth receiver 322-4.

There is a unique critical distance for every reflecting interface in the earth (such as the solid surface 304 and the subsurface reflector 360). The critical distance for shallower reflectors (such as the solid surface 304) is shorter than for deeper reflectors (such as the subsurface reflector 360). Regardless of the depth below the solid surface 304 of any reflector, the critical distance becomes a bigger issue when operating in shallower water. Marine survey data processing methods designed to enhance the desired signal, remove undesired noise or multiples, or attenuate undesired noise or multiples make use of the source wavefield that that penetrated the geological depths. The ability to interpret that wavefield is affected by cascading critical distances relevant to each interface between the solid surface 304 and the depth being considered.

In some marine survey locations, shallow water and/or highly reflective near-surface geology limits the critical distance 346 to short source-receiver offsets, which can make multiple removal difficult. In this context, "short source-receiver offsets" means that the source-receiver offset is shorter than a source receiver offset defined by the source 326 and a closest receiver on a closest streamer 320. Therefore, the more traces that are available within the critical distance 346, the better. Towed streamer 320 operations typically tow the sources 326 in front of the streamers 320, so data is received only for a small portion (or none) of the circle comprising the critical distance 346. Moreover, the typical setup only provides for positive source-receiver offsets. In many cases, the source-receiver offset for the closest receiver in an outer streamer 320 is not within the critical distance 346. In any event, typically, the common midpoint fold available for imaging near-surface reflectivity from outer streamers is low. The critical distance 346 in FIGS. 3A-3C is just an example for a given survey location and setup, but illustrates that a critical distance 346 can exist with little or no overlap of the streamers 320 and the receivers located thereon. This emphasizes a beneficial use case for at least one embodiment of the present disclosure that includes a receiver associated with a tow line, such as the umbilicals 323, to be towed in water within the critical distance 346 based on the relative position of the source 326 and the underlying geology. Shallow geology that is not typically imaged with the seismic data recorded in a typical manner can be imaged according to at least one embodiment of the present disclosure. Furthermore, imaging (or improved imaging) of that shallow geology according to at least one embodiment of the present disclosure can help remove noise or multiples that affect imaging of deeper geologies.

Surface-related multiple elimination (SRME) is just one example of multiple removal, which may also be referred to as a "demultiple method." Embodiments of the present disclosure are not limited to any particular demultiple method. SRME, by way of example, uses a shallow reflectivity model to predict surface multiples, and in some cases, all orders of surface multiples. The model of multiples is adaptively subtracted from recorded data during processing. If the reflectivity model from the recorded data imperfectly captures the reflectivity characteristics of the seafloor and near-surface geology, the multiples are imperfectly modeled and subtracted.

FIG. 4 illustrates an exemplary embodiment of a system 468 for marine survey data acquisition at a tow line. The system 468 includes a controller 419 coupled to an interrogator 421 via one or more communication links. The controller 419 includes processing resources 470-1 and memory resources 472-1. The interrogator 421 can include processing resources 470-2 and memory resources 472-2. The interrogator 421 can be an optoelectronic device coupled to fiber optic cables 480 at ports 478. Although not specifically illustrated, the ports 478 can be coupled to an optical source 474 and an optical receiver 476, or each port can have its own optical source and/or optical receiver. The optical source 474 can be a laser, a light emitting diode, or another type of optical source. The fiber optic cables 480 can be coupled to or integrated with tow lines such as super-wide ropes, lead-ins, or umbilicals. A fiber optic cable 480 includes at least a core optical fiber surrounded by cladding. In at least one embodiment, the fiber optic cables 480 also include a buffer around the cladding and a jacket around the buffer. The system 468 can function as a distributed acoustic sensing (DAS) system.

Rayleigh scattering based DAS systems use fiber optic cables 480 to provide distributed strain sensing. Rayleigh scattering is the predominantly elastic scattering of light or other electromagnetic radiation by particles much smaller than the wavelength of the radiation. For light frequencies well below the resonance frequency of the scattering particle, the amount of scattering is inversely proportional to the fourth power of the wavelength.

In DAS, the optical fiber is the sensing element. Measurements can be made, and in part processed, using the interrogator 421. Such a system allows acoustic frequency strain signals to be detected over distances and in harsh environments. A coherent laser pulse can be sent along an optical fiber and scattering sites within the fiber cause the fiber to act as a distributed interferometer with a gauge length approximately equal to the pulse length. The intensity of the reflected light can be measured as a function of time after transmission of the laser pulse. This is known as coherent Rayleigh optical time domain reflectometry. When the pulse has had time to travel the full length of the fiber and back, the next laser pulse can be sent along the fiber. Changes in the reflected intensity of successive pulses from the same region of fiber are caused by changes in the optical path length of that section of fiber. This type of system is sensitive to both strain and temperature variations of the fiber and measurements can be made almost simultaneously at all sections of the fiber.

Single mode fiber enables one type of light mode to be propagated at a time. Multimode fiber means the fiber can propagate multiple modes. The difference in core diameter between single and multimode fiber (multimode generally has a larger core diameter), along with wavelength and light source bandwidth allows for this propagation difference. An example of a single mode fiber core diameter is nine micrometers, whereas an example core diameter for multimode fiber is fifty micrometers. Conventionally, DAS systems tend to have limited signal-to-noise ratios because Rayleigh scattering is weak. Conventional DAS deployments may use conventional fiber optic cable, which is designed primarily to transmit telecommunication signals, and therefore to minimize scattering. However, according to at least one embodiment of the present disclosure, DAS systems, such as arrays, can use fiber optic cables designed specifically for the purpose of DAS, and therefore scatter a larger proportion of the light pulse. This produces a significant improvement in the signal quality. The improvement in the measurement sensitivity has been achieved by advancing the state of the DAS optoelectronics interrogator 421 architecture, together with the introduction of next generation engineered optical fiber. The optical fiber is engineered with bright scatter centers along its length to capture and reflect more light back to the interrogator 421. This is achieved without introducing significant loss to the forward propagating laser pulses. The DAS noise performance with engineered optical fiber is much lower (on the order of 20 decibels less) compared to that when using standard optical fiber. The DAS performance is comparable to that of geophones or hydrophones around 10 hertz but can far exceed the response of geophones or hydrophones in the 1 hertz range. The sensitivity of engineered optical fiber DAS systems can therefor approach or exceed that of typical seismic sensors such as geophones and hydrophones.

In at least one embodiment, the optical fiber has a linear shape. The optical fiber in a DAS system is most sensitive to strain along its longitudinal axis. Therefore, in at least one embodiment, the optical fiber can run along a longitudinal axis of the fiber optic cable 480 in a helical shape in order to provide sensitivity to signals received at angles not parallel to the fiber optic cable 480.

Examples of processing resources 470 include a processor, combinational logic, a field programmable gate array, an application specific integrated circuit, etc. The controller 419 and the interrogator 421 can include a combination of hardware and machine-readable instructions, which may also be referred to as program instructions. The program instructions can be stored in the memory resources 472 or embodied in the processing resources 470, which are configured to perform a number of functions described herein. For example, the program instructions can be analogous to those described with respect to FIG. 5. The program instructions, such as software, firmware, etc., can be stored in a memory resource such as a machine-readable medium, etc., as well as hard-wired program such as logic. Hard-wired program instructions can be considered as both program instructions and hardware.

The controller 419 and the interrogator 421 can utilize software, hardware, firmware, and/or logic to perform a number of functions. The controller 419 and the interrogator 421 can be a combination of hardware and program instructions configured to perform a number of functions and/or actions. The hardware, for example, can include processing resources 470 and memory resources 472, such as a machine-readable medium or other non-transitory memory resources. Although illustrated as being internal to the respective controller 419 and interrogator 421, the memory resources 472 can be internal and/or external thereto. In at least one embodiment, the controller 419 or the interrogator 421 can include internal memory resources 472 and have access to external memory resources. The program instructions, such as machine-readable instructions, can include instructions stored on the machine-readable medium to implement a particular function. The set of machine-readable instructions can be executable by one or more of the processing resources 470. The memory resources 472 can be coupled to the respective controller 919 or interrogator 421 in a wired and/or wireless manner. For example, the memory resources 472 can be an internal memory, a portable memory, a portable disk, and/or a memory associated with another resource, for example, enabling machine-readable instructions to be transferred and/or executed across a network such as the Internet.

The memory resources 472 can be non-transitory and can include volatile and/or non-volatile memory. Volatile memory can include memory that depends upon power to store data, such as various types of dynamic random-access memory among others. Non-volatile memory can include memory that does not depend upon power to store data. Examples of non-volatile memory can include solid state media such as flash memory, electrically erasable programmable read-only memory, phase change random access memory, magnetic memory, optical memory, and/or a solid-state drive, etc., as well as other types of non-transitory machine-readable media.

The processing resources 470 can be coupled to the memory resources 472 via a communication path. The communication path can be local or remote to the respective controller 419 or interrogator 421. Examples of a local communication path can include an electronic bus internal to a machine, where the memory resources are in communication with the processing resources via the electronic bus. Examples of such electronic buses can include Industry Standard Architecture, Peripheral Component Interconnect, Advanced Technology Attachment, Small Computer System Interface, Universal Serial Bus, among other types of electronic buses and variants thereof. The communication path can be such that the memory resources are remote from the processing resources, such as in a network connection between the memory resources and the processing resources. That is, the communication path can be a network connection. Examples of such a network connection can include a local area network, wide area network, personal area network, and the Internet, among others.

Figure 5:
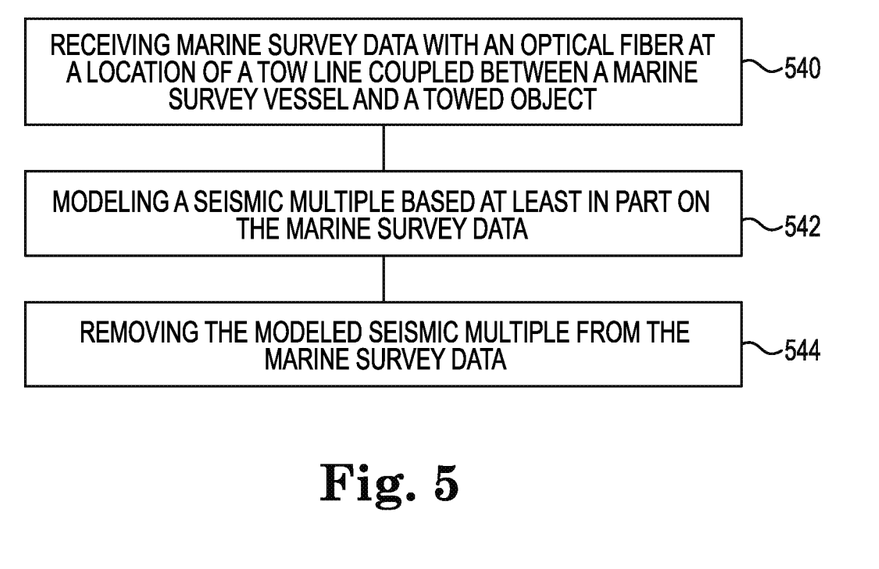
FIG. 5 illustrates an exemplary embodiment of a method for marine survey data acquisition at a tow line.

FIG. 5 illustrates an exemplary embodiment of a method for marine survey data acquisition at a tow line. At 590, the method can include receiving marine survey data with an optical fiber at a location of a tow line coupled between a marine survey vessel and a towed object. At 592, the method can include modeling a seismic multiple based at least in part on the marine survey data. At 594, the method can include removing the modeled seismic multiple from the marine survey data. In at least one embodiment, the method includes receiving the marine survey data at a negative source-receiver offset, as described herein. In at least one embodiment, the method includes receiving marine survey data in a near-offset range, thereby improving removal of the modeled seismic multiple from the marine survey data. A near-offset range is dependent upon the offset and the depth of the survey. An example of a near-offset range is for an offset-to-depth ratio of less than 0.5, however embodiments are not so limited.

In at least one embodiment, the towed object can be a source. The method can further include towing the source with the marine survey vessel and towing a streamer with the marine survey vessel. Receiving the marine survey data can include receiving signals between the marine survey vessel and the streamer, where signals are not typically received according to some previous approaches. Receiving the marine survey data can include receiving signals between the marine survey vessel and the source, where signals are not typically received according to some previous approaches.

In at least one embodiment, the towed object can be a streamer. The method can further include towing the streamer with the marine survey vessel. Receiving the marine survey data can include receiving signals between the marine survey vessel and the streamer, where signals are not typically received according to some previous approaches. The method can further include towing a source with the marine survey vessel. Receiving the marine survey data can include receiving signals between the source and the streamer, where signals are not typically received according to some previous approaches. Receiving the marine survey data can include receiving signals between the marine survey vessel and the source, where signals are not typically received according to some previous approaches.

In accordance with at least one embodiment of the present disclosure, a geophysical data product may be produced or manufactured. Geophysical data may be obtained from a marine survey and stored on a non-transitory, tangible machine-readable medium. The geophysical data can be obtained with a receiver at a location of a tow line coupled between a marine survey vessel and a towed object. The geophysical data product may be produced by processing the geophysical data offshore or onshore either within the United States or in another country. Processing the geophysical data can include modeling a seismic multiple based at least in part on the geophysical data and removing the modeled seismic multiple from the geophysical data. The geophysical data product can be recorded on a non-transitory machine-readable medium, thereby creating the geophysical data product. If the geophysical data product is produced offshore or in another country, it may be imported onshore to a facility in the United States. In some instances, once onshore in the United States, geophysical analysis may be performed on the geophysical data product. In some instances, geophysical analysis may be performed on the geophysical data product offshore.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system, comprising:
   a tow line, comprising an umbilical cable, configured to be coupled between a marine survey vessel and a towed object, comprising a source; and
   a receiver associated with the tow line, wherein the receiver is configured to receive marine survey data at a location of the tow line.

2. The system of claim 1, wherein at least a portion of the receiver is positioned with respect to the umbilical cable to be towed in water within a critical distance from the source during towing of the source.

3. The system of claim 1, wherein at least a portion of the receiver is positioned with respect to the umbilical to be towed in water at a negative offset from the source during towing of the source.

4. The system of claim 1, wherein the receiver comprises an optical fiber that runs along an interior space of the tow line.

5. The system of claim 4, wherein the optical fiber has a linear shape.

6. The system of claim 1, wherein the receiver comprises an optical fiber having a helical shape.

7. The system of claim 1, wherein the receiver comprises an engineered optical fiber; and
   wherein the system further comprises an interrogator coupled to the engineered optical fiber.

8. The system of claim 1, further comprising a plurality of tow lines configured to be coupled between the marine survey vessel and a respective plurality of towed objects; and
   a respective receiver comprising optical fiber associated with each of the plurality of tow lines, wherein the respective optical fiber is configured to receive marine survey data.

9. A system, comprising:
   a tow line, comprising a lead-in, configured to be coupled between a marine survey vessel and a towed object, comprising a paravane or a streamer having receivers;
   a receiver associated with the tow line, wherein the receiver is configured to receive marine survey data at a location of the tow line; and
   an umbilical cable configured to be coupled between a marine survey vessel and a source;
   wherein at least a portion of the receiver is positioned with respect to the lead-in to be towed in water within a critical distance from the source during towing of the source.

10. The system of claim 9, wherein at least a portion of the receiver is positioned with respect to the lead-in to be towed in water at a negative offset from the source during towing of the towed object and the source.

11. A system, comprising:
    a tow line configured to be coupled between a marine survey vessel and a towed object; and
    a receiver, comprising an optical fiber associated with the tow line, wherein the receiver is configured to receive marine survey data at a location of the tow line.

12. The system of claim 11, wherein the optical fiber runs along an interior space of the tow line.

13. The system of claim 12, wherein the optical fiber has a linear shape.

14. The system of claim 11, wherein the optical fiber has a helical shape.

15. The system of claim 11, wherein the optical fiber comprises an engineered optical fiber; and
    wherein the system further comprises an interrogator coupled to the engineered optical fiber.

16. The system of claim 11, further comprising a plurality of tow lines configured to be coupled between the marine survey vessel and a respective plurality of towed objects; and
    a respective receiver comprising optical fiber associated with each of the plurality of tow lines, wherein the respective optical fiber is configured to receive marine survey data.

* * * * *